(12) United States Patent
Arai

(10) Patent No.: US 11,207,617 B2
(45) Date of Patent: Dec. 28, 2021

(54) SHEARING MEMBER AND FILTRATION DEVICE

(71) Applicant: ARAI MACHINERY CORPORATION, Kanagawa (JP)

(72) Inventor: Koichi Arai, Kanagawa (JP)

(73) Assignee: ARAI MACHINERY CORPORATION

( * ) Notice: Subject to any disclaimer, the term of this patent is extended or adjusted under 35 U.S.C. 154(b) by 0 days.

(21) Appl. No.: 17/097,377

(22) Filed: Nov. 13, 2020

(65) Prior Publication Data

US 2021/0060460 A1    Mar. 4, 2021

Related U.S. Application Data

(63) Continuation of application No. PCT/JP2019/015933, filed on Apr. 12, 2019.

(30) Foreign Application Priority Data

May 5, 2018 (JP) .............................. JP2018-093516

(51) Int. Cl.
*B01D 29/64* (2006.01)
*B01D 29/15* (2006.01)
*B01D 29/90* (2006.01)

(52) U.S. Cl.
CPC ......... *B01D 29/6476* (2013.01); *B01D 29/15* (2013.01); *B01D 29/90* (2013.01)

(58) Field of Classification Search
None
See application file for complete search history.

(56) References Cited

U.S. PATENT DOCUMENTS

| 337,423 A | * | 3/1886 | Moore | ............... | B01D 24/4631 |
| | | | | | 210/796 |
| 810,020 A | * | 1/1906 | Applegate | .............. | B01D 33/06 |
| | | | | | 210/396 |

(Continued)

FOREIGN PATENT DOCUMENTS

JP    107413/1989    7/1989
JP    2001-219012    8/2001

(Continued)

OTHER PUBLICATIONS

USPTO PPH FAQ—11 pages (Year: 2018).*
Search Report for International Patent Application PCT/JP2019/015933, dated Nov. 21, 2019.

*Primary Examiner* — Robert J Popovics
(74) *Attorney, Agent, or Firm* — Fresh IP PLC; Clifford D. Hyra; Aubrey Y. Chen

(57) ABSTRACT

A shearing blade is used in a filtration device including a filtering element having a filtering surface and a plurality of filter pores provided on the filtering surface for filtering unfiltered fluid introduced into a primary side, a scraper abutting the filtering element for cleaning the filtering surface by rotating in a rotational direction, a pillar provided in the primary side to which the scraper is attached, and a tube body. The front end portion of the shearing blade is at least disposed between the filtering surface and a circle defined by the outer circumferential end of the pillar in the radial direction, and the distance between the front end portion and the filtering surface in the radial direction is shorter than the distance between the rear end portion of the shearing blade and the filtering surface in the radial direction.

13 Claims, 6 Drawing Sheets

(56) References Cited

U.S. PATENT DOCUMENTS

| | | | | |
|---|---|---|---|---|
| 1,033,745 | A * | 7/1912 | Smith | B01D 29/114 210/107 |
| 1,510,863 | A * | 10/1924 | Rose | B01D 29/25 210/413 |
| 1,995,649 | A * | 3/1935 | Rathbun | B01D 46/04 55/294 |
| 2,050,007 | A * | 8/1936 | Forrest | B01D 37/00 210/236 |
| 2,087,708 | A * | 7/1937 | Trinkle | B01D 29/6476 210/415 |
| 2,089,215 | A * | 8/1937 | Lomax | A47J 43/145 99/495 |
| 2,089,702 | A * | 8/1937 | Lomax | A23B 5/00 210/408 |
| 2,107,040 | A * | 2/1938 | Lomax | A23B 5/00 426/495 |
| 2,167,322 | A * | 7/1939 | Cuno | B01D 29/52 210/392 |
| RE21,639 | E * | 11/1940 | Trinkle | B01D 29/114 210/415 |
| 2,243,559 | A * | 5/1941 | Griffith | B01D 29/48 210/327 |
| 2,354,150 | A * | 7/1944 | Skinner | B01D 29/52 210/326 |
| 2,363,840 | A * | 11/1944 | Denhard | B01D 33/073 210/391 |
| 2,408,741 | A * | 10/1946 | Dodge | B01D 29/6476 210/355 |
| 2,439,463 | A * | 4/1948 | Gebauer | B01D 29/48 210/179 |
| 2,685,968 | A * | 8/1954 | Hertrich | B04B 11/08 210/375 |
| 2,713,921 | A * | 7/1955 | Turner | B01D 46/24 55/296 |
| 2,887,787 | A * | 5/1959 | Barkley | F26B 17/286 34/112 |
| 3,113,890 | A * | 12/1963 | Johnson | B05C 11/042 118/126 |
| 3,292,201 | A * | 12/1966 | Bedard | D21G 3/00 15/308 |
| 3,333,700 | A * | 8/1967 | Coleman | B01D 35/28 210/158 |
| 3,520,410 | A * | 7/1970 | Hutto, Jr. | B01D 33/073 210/784 |
| 3,574,098 | A * | 4/1971 | Boorujy | C02F 1/286 210/668 |
| 3,677,413 | A * | 7/1972 | Boorujy | C02F 1/286 502/404 |
| 3,762,563 | A * | 10/1973 | Petersen | B01D 29/118 210/415 |
| 3,859,691 | A * | 1/1975 | Katayama | G03G 21/0029 15/256.51 |
| 3,869,389 | A * | 3/1975 | Rokitansky | B01D 33/466 210/784 |
| 3,876,548 | A * | 4/1975 | Welles, Jr. | B01D 33/275 210/391 |
| 3,927,936 | A * | 12/1975 | Komori | G03G 21/0029 399/126 |
| 3,997,441 | A * | 12/1976 | Pamplin, Jr. | B01D 29/25 210/777 |
| 4,130,478 | A * | 12/1978 | Swallow | B01D 29/25 209/254 |
| 4,146,484 | A * | 3/1979 | Campbell | B01D 33/06 210/396 |
| 4,147,634 | A * | 4/1979 | Wegener | B01D 33/466 210/396 |
| 4,217,220 | A * | 8/1980 | Egli | B01D 29/6476 210/791 |
| 4,218,132 | A * | 8/1980 | Iwai | G03G 21/0011 15/256.51 |
| 4,220,540 | A * | 9/1980 | Hagihara | B01D 29/33 210/415 |
| 4,265,705 | A * | 5/1981 | Pyykkonen | D21G 3/005 100/174 |
| 4,273,655 | A * | 6/1981 | Reid | B01D 33/466 15/256.51 |
| 4,316,368 | A * | 2/1982 | Van Pelt | B01D 9/0013 62/542 |
| 4,337,158 | A * | 6/1982 | Bodine | B07B 1/50 210/785 |
| 4,347,134 | A * | 8/1982 | Svehaug | B01D 29/118 210/147 |
| 4,396,511 | A * | 8/1983 | Neumann | E02B 8/026 210/159 |
| 4,408,724 | A * | 10/1983 | Meyer | F04D 7/045 241/46.17 |
| 4,417,365 | A * | 11/1983 | Murasaki | G03G 21/0029 15/256.51 |
| 4,498,988 | A * | 2/1985 | Fujita | B01D 25/38 210/393 |
| 4,552,655 | A * | 11/1985 | Granot | B01D 29/114 210/108 |
| 4,673,496 | A * | 6/1987 | Turner, Jr. | B01D 33/073 162/306 |
| 4,673,502 | A * | 6/1987 | Fox | B01D 29/15 210/413 |
| 4,735,688 | A * | 4/1988 | Schwab | D21G 3/005 100/174 |
| 4,768,645 | A * | 9/1988 | Farris | B65G 45/16 15/256.5 |
| 4,880,539 | A * | 11/1989 | Crawford | B01D 29/6476 210/408 |
| 4,994,332 | A * | 2/1991 | Coin | B01D 36/00 429/405 |
| 5,026,487 | A * | 6/1991 | Abdulmassih | B01D 33/58 210/791 |
| 5,032,229 | A * | 7/1991 | Boucher | D21G 3/005 162/281 |
| 5,087,365 | A * | 2/1992 | Davis | B01D 29/118 210/415 |
| 5,183,568 | A * | 2/1993 | Lescovich | B01D 29/118 210/360.1 |
| 5,198,111 | A * | 3/1993 | Davis | B01D 29/118 210/408 |
| 5,262,069 | A * | 11/1993 | Kato | B01D 33/073 210/777 |
| 5,332,499 | A * | 7/1994 | Spencer | B01D 33/073 210/396 |
| 5,370,791 | A * | 12/1994 | Lescovich | B01D 29/118 210/107 |
| 5,401,396 | A * | 3/1995 | Lescovich | B01D 29/118 210/108 |
| 5,407,587 | A * | 4/1995 | Westerberg | B01D 33/073 210/784 |
| 5,443,726 | A * | 8/1995 | Steiner | B01D 29/15 210/393 |
| 5,527,462 | A * | 6/1996 | Davis | B01D 29/25 210/407 |
| 5,569,383 | A * | 10/1996 | Vander Ark, Jr. | B01D 29/6484 210/408 |
| 5,595,655 | A * | 1/1997 | Steiner | B01D 29/15 210/391 |
| 5,656,162 | A * | 8/1997 | Nilsson | B01D 33/067 210/236 |
| 5,779,901 | A * | 7/1998 | Mosca | B01D 29/117 210/411 |
| 6,022,451 | A * | 2/2000 | Macierewicz | D21G 3/005 15/308 |
| 6,177,021 | B1 * | 1/2001 | Matusch | B04B 11/08 210/360.1 |
| 6,177,022 | B1 * | 1/2001 | Benenson, Jr. | B01D 29/15 210/791 |
| 6,187,177 | B1 * | 2/2001 | Ogburn | B01D 29/15 210/85 |
| 6,517,722 | B1 * | 2/2003 | Benenson, Jr. | B01D 29/15 210/323.2 |

(56) References Cited

U.S. PATENT DOCUMENTS

| | | | | |
|---|---|---|---|---|
| 6,666,976 B2* | 12/2003 | Benenson, Jr. | ........ | B01D 29/15 210/784 |
| 6,676,834 B1* | 1/2004 | Benenson, Jr. | ........ | B01D 29/15 210/323.2 |
| 6,712,981 B2* | 3/2004 | Benenson, Jr. | ........ | B01D 29/15 210/785 |
| 6,821,444 B2* | 11/2004 | Benenson, Jr. | ........ | B01D 29/15 210/785 |
| 6,861,004 B2* | 3/2005 | Benenson, Jr. | ........ | B01D 29/15 210/785 |
| 7,083,735 B2* | 8/2006 | Laing | ........ | B01D 29/114 210/791 |
| 7,364,662 B2* | 4/2008 | Laing | ........ | B01D 33/466 210/791 |
| 7,445,123 B1* | 11/2008 | Chiou | ........ | B01D 29/6476 210/415 |
| 7,473,375 B2* | 1/2009 | Stoerzer | ........ | B01D 29/94 210/791 |
| 7,501,058 B1* | 3/2009 | Lawrence, Sr. | ........ | B01D 29/33 210/232 |
| 8,679,335 B1* | 3/2014 | Dufort | ........ | B01D 29/33 210/241 |
| 9,211,489 B2* | 12/2015 | Riggers | ........ | B01D 29/64 |
| 9,259,674 B2* | 2/2016 | Hammarberg | ........ | B01D 33/466 |
| 9,327,219 B2* | 5/2016 | Brunswick | ........ | B01D 29/114 |
| 9,561,454 B2* | 2/2017 | Browning | ........ | B01D 29/035 |
| 10,245,531 B2* | 4/2019 | Steiner | ........ | B01D 29/688 |
| 10,286,339 B2* | 5/2019 | Crandall | ........ | B01D 35/02 |
| 10,583,379 B2* | 3/2020 | Cote | ........ | B01D 33/503 |
| 10,596,497 B2* | 3/2020 | Backman | ........ | B01D 29/6484 |
| 10,646,801 B2* | 5/2020 | Tameroglu | ........ | B01D 29/35 |
| 10,688,419 B2* | 6/2020 | Browning | ........ | B01D 29/682 |
| 10,751,764 B2* | 8/2020 | Dagan | ........ | B08B 5/04 |
| 11,103,812 B2* | 8/2021 | Canaia | ........ | B29C 48/693 |
| 2013/0087495 A1* | 4/2013 | Riggers | ........ | B01D 29/682 210/415 |
| 2014/0097145 A1* | 4/2014 | Browning | ........ | B01D 29/682 210/780 |
| 2014/0124432 A1* | 5/2014 | Yoon | ........ | B01D 29/114 210/355 |
| 2015/0165354 A1* | 6/2015 | Brunswick | ........ | B01D 29/114 210/94 |
| 2016/0214039 A1* | 7/2016 | Tameroglu | ........ | B01D 29/6446 |
| 2017/0014736 A1* | 1/2017 | Osman Oguz | ........ | B01D 29/606 |
| 2017/0136391 A1* | 5/2017 | Crandall | ........ | E21B 27/005 |
| 2017/0144087 A1* | 5/2017 | Browning | ........ | B01D 29/682 |
| 2021/0060460 A1* | 3/2021 | Arai | ........ | B01D 29/62 |

FOREIGN PATENT DOCUMENTS

| | | | | |
|---|---|---|---|---|
| JP | 2003-211292 | 7/2003 | | |
| JP | 2005-113520 | 4/2005 | | |
| JP | 2006-116411 | 5/2006 | | |
| JP | 2011-098309 | 5/2011 | | |
| JP | 2012-000651 | 1/2012 | | |
| JP | 2014-091079 | 5/2014 | | |
| WO | WO-2020167623 A1 * | 8/2020 | ........ | B01D 29/6476 |

* cited by examiner

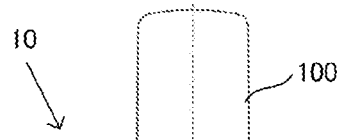
Fig. 1
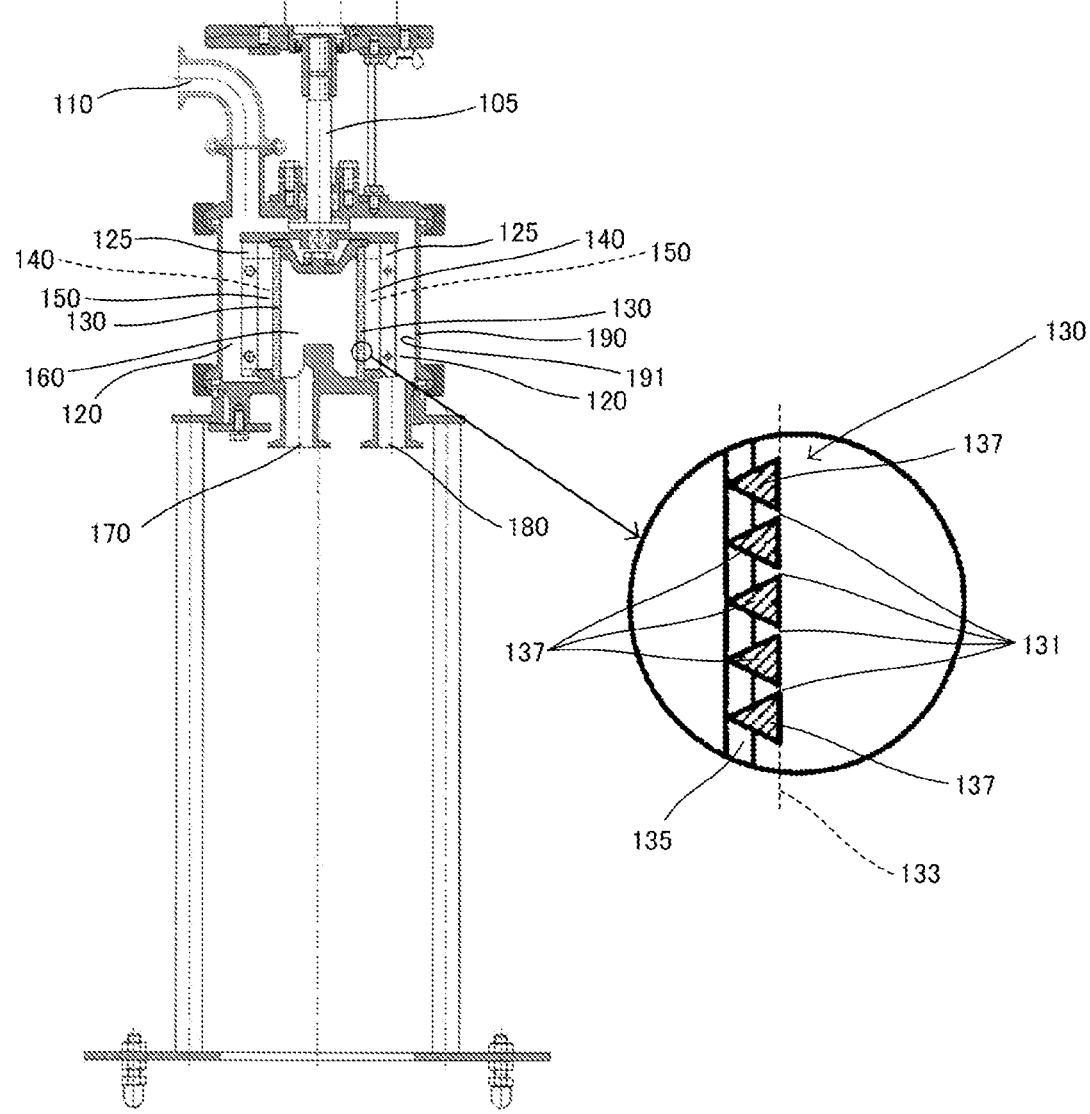

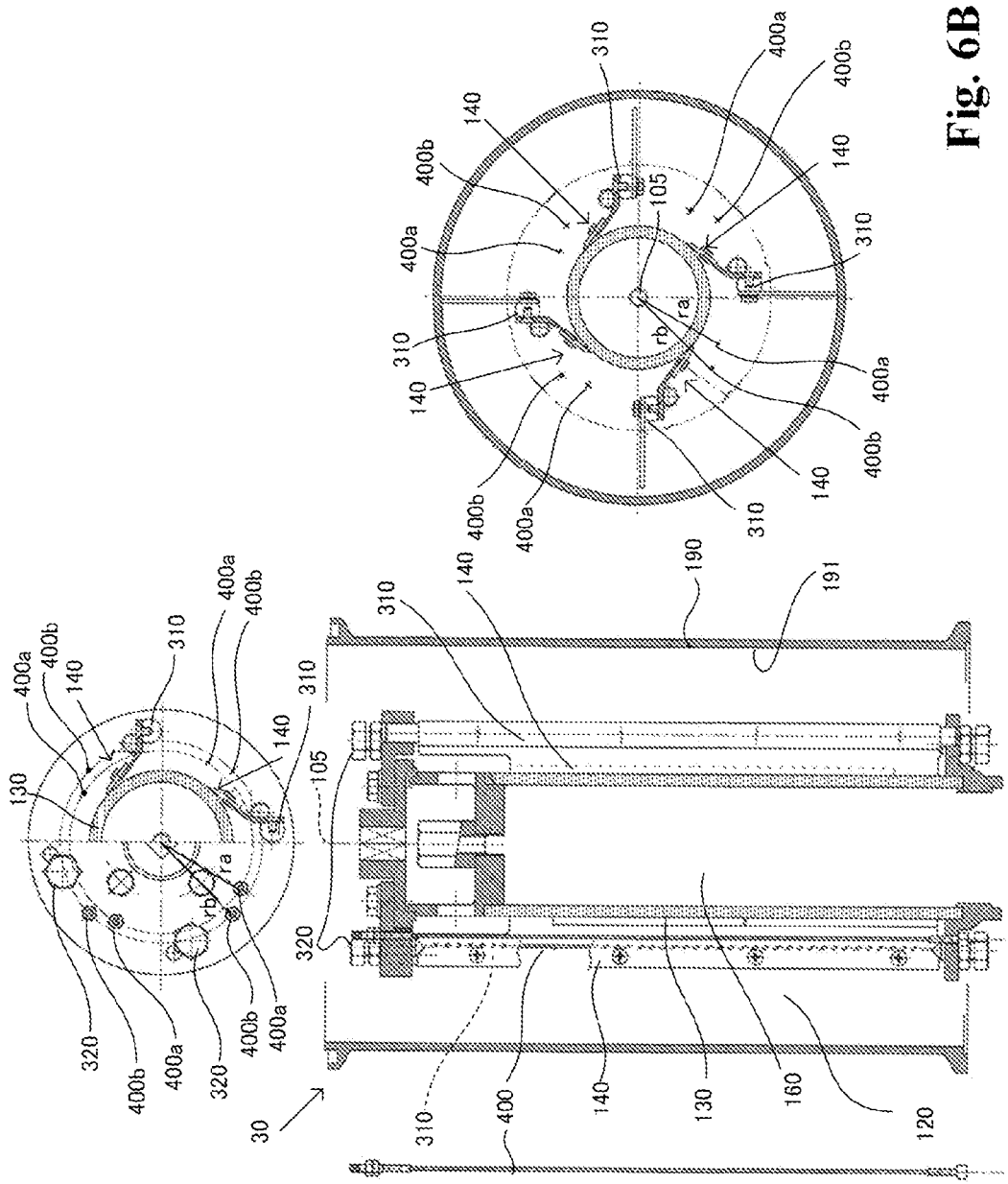

SHEARING MEMBER AND FILTRATION DEVICE

CROSS-REFERENCE TO RELATED APPLICATION

The present application is a continuation application of International Application No. PCT/JP2019/220828, filed Apr. 12, 2019, claiming priority to the Japanese patent application No. JP 2018-093516, filed May 15, 2018. The contents of this application are incorporated herein by reference in its entirety.

BACKGROUND

Field

The invention relates to a shearing member and a filtration device comprising such shearing member.

Description of the Related Art

Conventionally, a filtration device is provided with a filtering media such as a filter at a boundary between a primary side and a secondary side. The filtration device supplies unfiltered fluid which includes a dispersion medium of gas or liquid and a dispersion phase of fine particles from a primary side, and filters the supplied unfiltered fluid through the filtering media to obtain a filtrate at a secondary side. Kinds of filtration performed by the filtration device include, for example, classification filtration, concentration filtration, squeeze filtration, straw filtration, and the like. In addition, the filtration device is used in a variety of fields such as production of food and beverage, or production of batteries.

The filtering media of the filtration device has a plurality of filter pore on the filtering surface for filtering unfiltered fluid into a filtrate having a predetermined slurry density. Further, the filtration device is provided with a cleaning member such as a scraper for removing residues accumulated on the surface of the filtering media at the primary side to prevent clogging at the plurality of filter pore of the filtering media (see, for example, JP-A-2006-116411).

However, although occurrence of clogging at the plurality of filter pore can be prevented by the cleaning member, there are some cases where the filtrate at a predetermined slurry density cannot be obtained at the secondary side of the filtration device because of the following phenomena. That is, unfiltered fluid which is continuously supplied at the primary side is filtered, but the residues removed by the cleaning member stays in the vicinity of the filtering surface without being sedimented. Thus, a layer having a predetermined thickness (hereinafter, referred to as concentrated layer) is formed in a substantially doughnut shape at the periphery of the filtering surface of filtering media wherein the unfiltered fluid has a higher concentration. When the concentrated layer is formed, the concentrated layer itself functions as a filtering media, so that a filtrate having a predetermined slurry density cannot be obtained on the secondary side. Such phenomena are more likely to occur when unfiltered fluid is of high slurry or high viscosity. In addition, the phenomena are more likely to occur when the dispersed phase in the unfiltered fluid is of fine particles. Therefore, it is desired to obtain a filtrate having a predetermined slurry density by reducing or preventing generation of a concentrated layer in the filtration device.

In view of the above circumstances, it is an exemplary problem of the present invention to provide a shearing member and a filtration device for reducing or preventing concentration of unfiltered fluid around a filtering surface of a filtering media of the filtration device.

SUMMARY

The present invention has the following configuration in order to solve the above problems.

[Point 1] A shearing member used in a filtration device, the filtration device having:
  a filtering media having a filtering surface and a plurality of filter pores provided on the filtering surface for filtering unfiltered fluid introduced into a primary side,
  a cleaning member abutting the filtering media for cleaning the filtering surface by rotating in a rotational direction,
  a pillar provided at the primary side with its longitudinal direction in the vertical direction which is substantially perpendicular to the rotational direction, to which the cleaning member is attached, and
  a tube body housing the filtering media, the cleaning member, and the pillar; the shearing member comprising:
  a blade having a downstream end in the rotational direction and an upstream end in the rotational direction and mounted to the cleaning member; wherein
  at least the downstream end of the blade is disposed between the filtering surface and a circle defined by the outer circumferential end of the pillar in a radial direction substantially perpendicular to the rotational direction, and
  a distance between the downstream end and the filtering surface in the radial direction is shorter than a distance between the upstream end and the filtering surface in the radial direction.

[Point 2] The downstream end of the blade may have a comb blade shape wherein convex portions and concave portions are arranged consecutively.

[Point 3] A plurality of blades may be mounted in the radial direction to the cleaning member.

[Point 4] A shearing member used in a filtration device, the filtration device having:
  a filtering media having a filtering surface and a plurality of filter pores provided on the filtering surface for filtering unfiltered fluid introduced into a primary side,
  a cleaning member abutting the filtering media for cleaning the filtering surface by rotating in a rotational direction,
  a pillar provided at the primary side with its longitudinal direction in the vertical direction which is substantially perpendicular to the rotational direction, to which the cleaning member is attached, and
  a tube body housing the filtering media, the cleaning member, and the pillar; the shearing member comprising:
  a first linear member extending in the vertical direction, and
  a second liner member disposed at the upstream side in the rotational direction and extending in the vertical direction; wherein
  at least the first linear member is disposed between the filtering surface and a circle defined by the outer circumferential end of the pillar in a radial direction substantially perpendicular to the rotational direction, and a distance between the first linear member and the filtering surface in the radial direction is shorter than a distance between the second linear member and the filtering surface in the radial direction.

[Point 5] A filtration device comprising:

a filtering media having a filtering surface and a plurality of filter pores provided on the filtering surface for filtering unfiltered fluid introduced into a primary side, a cleaning member abutting the filtering media for cleaning the filtering surface by rotating in a rotational direction, a pillar provided at the primary side with its longitudinal direction in the vertical direction which is substantially perpendicular to the rotational direction, to which the cleaning member is attached, a shearing member according to any one of the points 1 to 4, and a tube body housing the filtering media, the cleaning member, the pillar, and the shearing member.

[Point 6] A stirring member may be attached to the pillar for stirring the unfiltered fluid in the vicinity of the inner wall of the tube body.

[Point 7] The pillar is rotatable around a central axis of the pillar.

(Point 2-1) A shearing member used in a filtration device, the filtration device having:

a filtering media having a filtering surface and a plurality of filter pores provided on the filtering surface for filtering unfiltered fluid introduced into a primary side, a cleaning member abutting the filtering media for cleaning the filtering surface by rotating in a rotational direction, a pillar provided at the primary side with its longitudinal direction in the vertical direction which is substantially perpendicular to the rotational direction, to which the cleaning member is attached, and a tube body housing the filtering media, the cleaning member, and the pillar; wherein at least the downstream side is disposed between the filtering surface and a circle defined by the outer circumferential end of the pillar in a radial direction substantially perpendicular to the rotational direction, and a distance between the downstream side and the filtering surface in the radial direction is shorter than a distance between the upstream side and the filtering surface in the radial direction.

(Point 2-2) The shearing member may be a blade which is attached to the cleaning member.

(Point 2-3) The blade may have at the downstream side a comb blade shape wherein convex portions and concave portions are arranged consecutively.

(Point 2-4) A plurality of blades may be mounted to the cleaning member.

(Point 2-5) The shearing member may be at least two linear members.

(Point 2-6) A filtration device comprising:

a filtering media having a filtering surface and a plurality of filter pores provided on the filtering surface for filtering unfiltered fluid introduced into a primary side, a cleaning member abutting the filtering media for cleaning the filtering surface by rotating in a rotational direction, a pillar provided at the primary side with its longitudinal direction in the vertical direction which is substantially perpendicular to the rotational direction, to which the cleaning member is attached, a shearing member according to any one of the points 2-1 to 2-5, and a tube body housing the filtering media, the cleaning member, the pillar, and the shearing member.

(Point 2-7) A stirring member may be attached to the pillar for stirring the unfiltered fluid in the vicinity of the inner wall of the tube body.

(Point 2-8) The pillar is rotatable around a central axis of the pillar.

Further objects or other features of the present invention will become apparent from the preferred embodiments described hereinafter with reference to the attached drawings.

According to the present invention, it is possible to provide a shearing member and a filtration device for reducing or preventing concentration of unfiltered fluid around a filtering surface of a filtering media of the filtration device.

BRIEF DESCRIPTION OF THE DRAWINGS

FIG. 1 shows a longitudinal sectional view showing the filtration device of the first embodiment and enlarged longitudinal cross-sectional view of a filtering surface;

FIG. 6A shows a longitudinal sectional view showing the main part of a filtration device, and top view and cross-sectional view showing the vicinity of a shearing wire, and FIG. 6B shows a cross-sectional view showing the inside of a cylindrical body of the third embodiment.

DETAILED DESCRIPTION

First Embodiment

<Filtration Device>

Figure 2A:
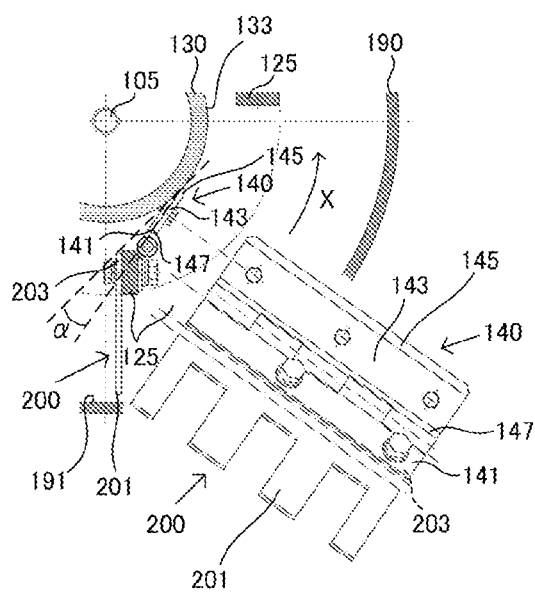
FIGS. 2A to 2D show cross-sectional and front views illustrating the scraper and stirring blade in various forms of the first embodiment.

Specific configuration of the filtration device 10 according to the first embodiment will be described with reference to the drawings. FIG. 1 shows a longitudinal sectional view showing a configuration of the filtration device 10 of the first embodiment and an enlarged longitudinal sectional view in the vicinity of the filtering element 130 of the filtration device. The filtration device 10 includes a motor 100, a rotating shaft 105, an unfiltered fluid inlet 110, a primary side chamber 120, pillars 125, the filtering element 130 which is a filtering media, scrapers 140 which are cleaning members, shearing blades 150 which are shearing members, a secondary side chamber 160, a filtrate outlet 170, a drain outlet 180, and a tube body 190.

The motor 100 is connected to the pillars 125 via the rotating shaft 105. The motor 100 rotates the pillars 125 and the scrapers 140 and the shearing blades 150 mounted to the pillars 125 via the rotating shaft 105 in a predetermined rotational direction X (see FIGS. 2A to 2D) and at a predetermined rotational speed. Motor 100 rotates the pillars 125 and the scrapers 140 and the shearing blades 150 attached to the pillars 125, for example, from 1 to 30 revolutions per minute.

The unfiltered fluid inlet 110 is an opening for introducing the unfiltered fluid comprising, for example, a solid dispersion phase and a gas or liquid dispersion medium into the primary side chamber 120. The unfiltered fluid inlet 110 is provided on the tube body 190 side (outer circumferential side) and on the upper side of the filtering element 130 in a radial direction (hereinafter, simply referred to as radial direction) about the rotating shaft 105. As a result, the unfiltered fluid in the primary side chamber 120 is pressurized from the outer circumferential side in the radial direction and from the upper side in the vertical direction, and flows toward the filtering element 130.

The primary side chamber 120 is a space formed by the filtering element 130 and the tube body 190, and is a primary side space for filtering the unfiltered fluid introduced from the unfiltered fluid inlet 110 by the filtering element 130. The pillars 125 are provided vertically in the primary side chamber 120 and are provided for mounting the scrapers 140 and the shearing blades 150. In the filtration device 10 of FIG. 1, for example, 4 pillars 125 are provided. The number of pillars 125 is not limited to four. The four pillars 125 are rotated by the motor 100 and rotate about the rotating shaft 105 within the unfiltered fluid in the primary side chamber 120. For example, when the diameter of the filtering element 130 is about 75 mm, the radial length of the pillar 125 is about 10 mm or more.

The filtering element 130 has a cylindrical shape with a substantially circular top view. The filtering element 130 is a filtering media for filtering unfiltered fluid in the primary side chamber 120, and by this filtering of unfiltered fluid by the filtering element 130, a filtrate having a predetermined slurry density is obtained in the secondary side chamber 160. The filtering element 130 has filter pores 131 which are a plurality of pores for obtaining a filtrate of a predetermined slurry density. The surface of the filtering element 130 facing the primary side chamber 120 is hereinafter referred to as filtering surface 133. Detailed configuration of the filtering element 130 will be described later.

The scrapers 140 are provided in contact with the filtering surface 133 of the filtering element 130 in the primary side chamber 120. The scrapers 140 prevent clogging of the filter pores 131 of the filtering element 130 by removing the residues left on the filtering surface 133 after the unfiltered fluid has been filtered by the filtering element 130. Thus, the unfiltered fluid in the primary side chamber 120 is smoothly supplied to the filter pores 131. Detailed configuration of the scrapers 140 will be described later.

The shearing blades 150 are radially provided in the vicinity of the scrapers 140 in the primary side chamber 120. The shearing blades 150 are not in contact with the filtering surface 133 of the filtering element 130. The residues removed by the scrapers 140 are sedimented downward in the vertical direction, and is discharged from the drain outlet 180 into a container (not shown). Here, when the unfiltered fluid is of a high slurry and high viscosity, a phenomenon in which the residues removed by the scrapers 140 are not sedimented but stays on the filtering surface 133 and the concentration of the unfiltered fluid is increased in the vicinity of the filtering surface 133 occurs. Thus, the above-described concentrated layer is formed, and the concentrated layer itself functions as a filtering media, so that the filtrate of a predetermined slurry concentration may not be obtained on the secondary side. The shearing blades 150 are shearing members for reducing or preventing the generation of such concentrated layers. Detailed configuration of the shearing blades 150 will be described later.

The secondary side chamber 160 is a space in the filtering element 130 and is a secondary side space for obtaining the filtrate filtered by the filtering element 130. The filtrate outlet 170 is an opening for releasing the filtrate which is filtered by the filtering element 130 and obtained in the secondary side chamber 160 into a storage tank (not shown). The drain outlet 180 is an opening for discharging the residues sedimented after the filtration treatment into a container (not shown).

The tube body 190 has a cylindrical shape with a substantially circular top view. The tube body 190 has the pillars 125, the filtering element 130, the scrapers 140, and the shearing blades 150, and an inner wall 191 of the tube body 190 and the filtering surface 133 of the filtering element 130 form the primary side chamber 120. As shown in FIG. 1, the unfiltered fluid inlet 110 is provided above the tube body 190 and closer to the inner wall 191 than the filtering element 130. In the radial direction, the unfiltered fluid flows from the inner wall 191 to the filtering element 130. The flow of the unfiltered fluid in the vicinity of the inner wall 191 is referred to as wake flow.

<Filtering Element>

The configuration of the filtering element 130 is here described using FIG. 1. The circled portion in FIG. 1 is an enlarged longitudinal sectional view showing the configuration of the filtering element 130 of the first embodiment. The filtering element 130 has, for example, a diameter of about 75 mm or more and a vertical length of 110 mm or more, and is formed of, for example, stainless-steel, Hastelloy, or the like. The filtering element 130 has a cylindrical portion 135, a wire 137, a plurality of filter pores 131, and a filtering surface 133.

The cylindrical portion 135 has a cylindrical shape with a substantially circular top view. The wires 137 are coiled around the primary side chamber 120 of the cylindrical portion 135. For example, in the filtering element 130 of the filtration device 10 of FIG. 1, the wires 137 are coiled around the cylindrical portion 135. As a result, a plurality of slit-shaped filter pores 131 are formed between the vertically adjacent wires 137. The size of the filter pores 131 is determined depending on the slurry density of the filtrate and is, for example, 3 to 300 μm or more. For example, as shown in FIG. 1, the wires 137 have a triangular cross-section, and the filter pores 131 are formed between the edges of the wires 137 adjacent to each other in the vertical direction. Thus, the filtration resistance can be reduced, and even from a high slurry or a high viscosity unfiltered fluid a filtrate having a predetermined slurry concentration can be obtained. The filtering surface 133 is formed by the sides of the triangular cross sections of the wires 137 arranged vertically and consecutively. The configuration of the filtering element 130 is not limited to this configuration, and for example, a wedge screen may be used, or the cylindrical portion 135 may be provided with a plurality of filter pores 131 by laser-beam processing, photo-etching, or the like.

<Scrapers>

The configuration of the scrapers 140 is here described using FIGS. 2A to 2D. FIG. 2A shows a view showing the configuration of the scraper 140 of the first embodiment, showing approximately a quarter of the cross-sectional view of the tube body 190, and also showing a front view of a scraper 140. Incidentally, for simplicity of the drawings, in FIGS. 2A to 2C, the shearing blades 150 are not shown. The scraper 140 is formed of, for example, stainless-steel, carbon, resins, or the like. The scraper 140 has a support portion 141 and a blade portion 143.

Figure 2B:
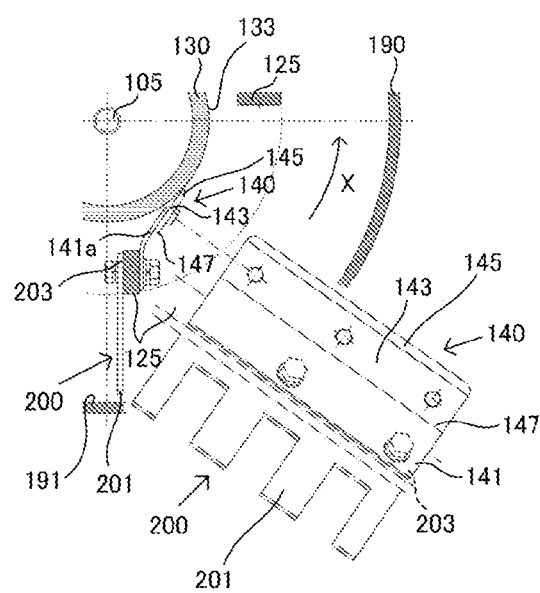

The support portion 141 is attached to the pillar 125 provided in the primary side chamber 120, for example by screws or the like to support the blade portion 143. The support portion 141 is, for example, a hinge as shown in FIG. 2A. When the hinge is composed of a plurality of members, the unfiltered fluid may enter the connecting portions of the members. Therefore, in order to prevent the unfiltered fluid from entering the connecting portions of the respective members of the supporting portion 141, the supporting portion 141 may be, for example, a fixed blade 141a which is an integral supporting portion as shown in FIG. 2B. The length of the scraper 140 in the vertical direction may be shorter than the length of the pillar 125 in the vertical direction. Therefore, the number of the scrapers 140 attached to one pillar 125 may be at least one or more.

The blade portion 143 has a front end portion 145 and a rear end portion 147 and is attached to the support portion 141 by, for example, screws or the like. The blade portion 143 is attached to the support portion 141, so that the front end portion 145 is at the downstream side in the rotation direction X and the rear end portion 147 is at the upstream side in the rotation direction X. The vertical length of the blade portion 143 is substantially the same as the vertical length of the support portion 141, but is not limited thereto. The front end portion 145 of the blade portion 143 is in contact with the filtering surface 133 of the filtering element 130, and the support portion 141 and the blade portion 143 are attached to the pillar 125 such that the angle α between the tangent at the point of contact between the front end portion 145 and the filtering surface 133, and the blade portion 143 is an acute angle (α<90°). Thus, depending on the rotational behavior of the scraper 140 in the rotational direction X, the residues on the filtering surface 133 are removed by the blade portion 143 of the scraper 140. Further, such configuration of the scraper 140 prevents clogging of the filter pores 131.

As shown in FIG. 2A, the front end portion 145 has a wedge shape in which the front end portion 145 is inclined toward the downstream side in the rotational direction X and toward the filtering surface 133 in the rotational direction X, but may not have a wedge shape. As shown in FIG. 2A, the front end portion 145 of the scraper 140 may have a surface shape in a front view, or may have a comb blade shape in which convex portions and concave portions are consecutively arranged. When the front end portion 145 has a comb blade shape, the width and depth of the convex portions and the concave portions, the shape and the like of each convex portions and each concave portions may be of any width, depth, shape and the like.

Figure 2C:
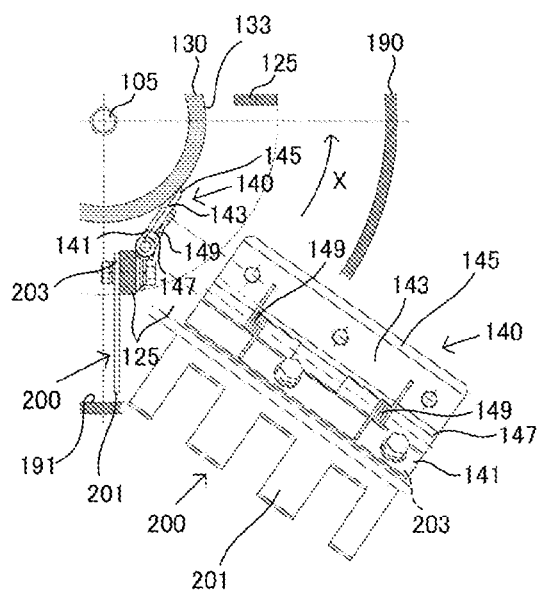

As shown in FIG. 2C, when the support portion 141 is a hinge, a spring 149 may be provided on the core rod portion of the hinge to prevent the blade portion 143 from coming into non-contact with the filtering surface 133 of the filtering element 130.

<Stirring Blade>

The filtration device 10 of FIG. 1 may have a stirring blade 200 as a stirring member. The configuration of the stirring blades 200 is here described using FIGS. 2A to 2D.

Figure 2D:
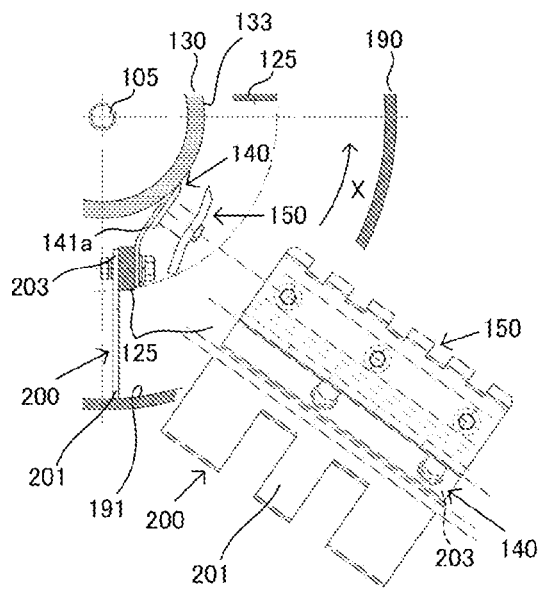

The stirring blade 200 is a stirring member for smoothing the wake flow in the primary side chamber 120 and preventing the unfiltered fluid from staying in the vicinity of the inner wall 191 or adhering to the inner wall 191. The stirring blade 200 includes a front end portion 201 and a rear end portion 203. In the stirring blade 200, the rear end portion 203 is attached to the pillar 125 by, for example, bolts so that the front end portion 201 is on the inner wall 191 side and the rear end portion 203 is on the filtering element 130 side. The front end portion 201 of the stirring blade 200 may be provided so as to form a predetermined gap with the inner wall 191 as shown in FIGS. 2A to 2C, or may be provided so as to abut the inner wall 191 as shown in FIG. 2D. Incidentally, FIG. 2D shows the shearing blade 150, and some of the reference signs are omitted for visibility of the drawing.

As shown in FIGS. 2A to 2D, the front end portion 201 of the stirring blade 200 may have a comb blade shape in which convex portions and concave portions are consecutively arranged, or may not have such comb blade shape. When the front end portion 201 has a comb blade shape, the width and depth of the convex portions and the concave portions, the shape and the like of each convex portions and each concave portions may be of any width, depth, shape and the like.

<Shearing Blade>

Figure 3:
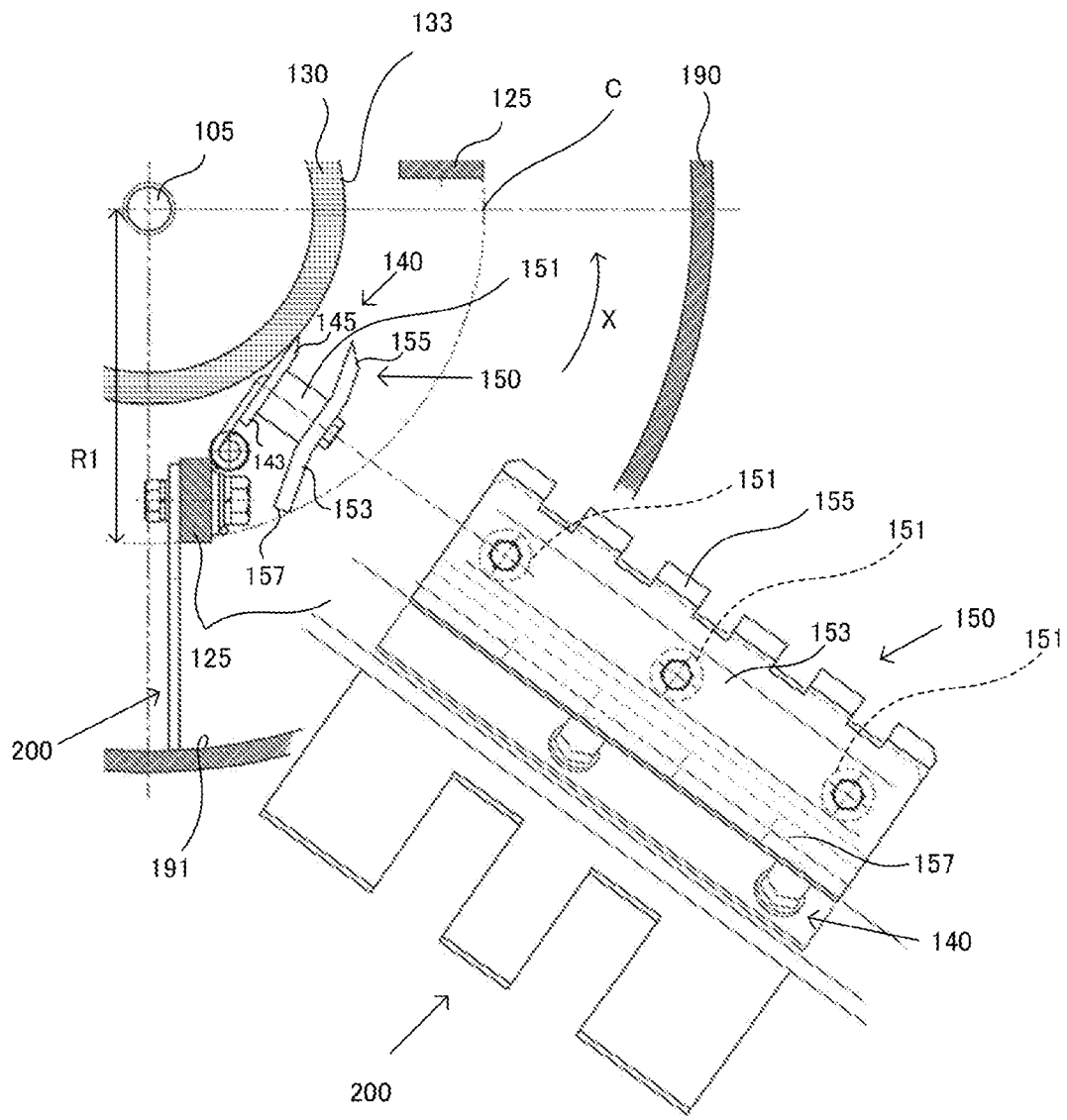
FIG. 3 shows cross-sectional and front views illustrating the shearing blade of the first embodiment.

The configuration of the shearing blades 150 as shearing members in the first embodiment is here described using FIG. 3. FIG. 3 shows a cross-sectional view showing the configuration of the shearing blade 150 of the first embodiment, showing approximately a quarter of the cross-sectional view of the tube body 190, and also showing a front view of the shearing blade 150. The shearing blade 150 is formed of, for example, stainless-steel, carbon, resins, or the like. The shearing blade 150 has a mounting portion 151 and a body 153. The mounting portion 151 is a member for attaching the body 153 to the scraper 140.

The body 153 has a front end portion 155 (downstream end in the rotational direction) and a rear end portion 157 (upstream end in the rotational direction) and is attached to the blade portion 143 of the scraper 140 via the mounting portion 151, for example by screws or the like. The body 153 is attached to the mounting portion 151 so that the front end portion 155 is at the downstream side in the rotation direction X, and the rear end portion 157 is at the upstream side in the rotation direction X. The body 153 is not in contact with the filtering surface 133 of the filtering element 130 and is mounted such that the radial distance between the front end portion 155 and the filtering surface 133 of the filtering element 130 is less than the radial distance between the rear end portion 157 and the filtering surface 133 of the filtering element 130. That is, the front end portion 155 is closer to the filtering surface 133 than the rear end portion 157.

The distance (clearance) in the radial direction between the front end portion 155 of the shearing blade 150 and the front end portion 145 of the scraper 140 may be set according to the diameters of the tube body 190 and the filtering element 130 or the slurry concentrations of the unfiltered fluid, and may be sufficient if it is at least 5 mm or more. Here, the circle shown by the two-dot chain line and defined by a radius R1 from the center of the rotating shaft 105 to the outer end of the pillar 125 in the radial direction is referred as circle C. The concentrated layer is likely to be generated between the filtering surface 133 of the filtering element 130 and the circle C. Therefore, at least the front end portion 155 of the shearing blade 150 is arranged between the filtering surface 133 and the circle C.

The front end portion 155 of the shearing blade 150, as shown in FIG. 3, has a wedge shape inclined toward the downstream side and the filtering surface 133 side in the rotational direction X, and in a front view, has a comb blade shape wherein the convex portions and the concave portions are arranged consecutively. When the front end portion 155 has a comb blade shape, the width and depth of the convex portions and the concave portions, the shape and the like of each convex portions and each concave portions may be of any width, depth, shape and the like. The front end portion 155 of the shearing blade 150 splits the unfiltered fluid containing the residues in the vicinity of the filtering surface 133 of the filtering element 130 by shear force, and the fragmented unfiltered fluid flows toward the rear end portion 157 side, thereby reducing or preventing the generation of the concentrated layer, and the residue is normally sedimented. The front end portion 155 may not necessarily have the wedge shape.

Other Embodiments of Shearing Blade

Figure 4A:
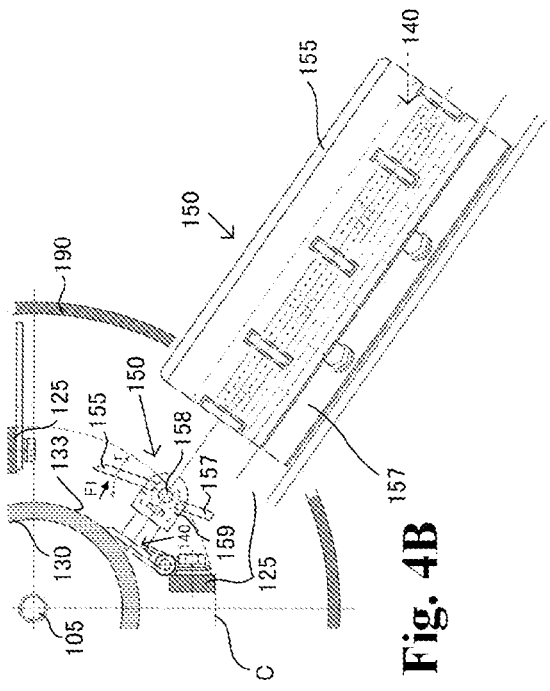
FIGS. 4A to 4D show cross-sectional and front views illustrating the shearing blades in various forms of the first embodiment.

FIGS. 4A to 4D show cross-sectional views showing the configurations of other embodiments of the shearing blades 150, showing approximately a quarter of the cross-sectional view of the tube body 190, and also showing a front view of the shearing blades 150. In FIG. 3, the front end portion 155 of the shearing blade 150 had a comb blade shape, whereas the front end portion 155 may have a surface shape as shown in FIG. 4A. Further, the rear end portion 157 of the shearing blade 150 in FIG. 3 was located within the circle C, however, as shown in FIG. 4A, may have a length protruding toward the outer peripheral side of the circle C, or a comb blade shape wherein a plurality of convex portions and a plurality of concave portions are arranged consecutively.

Figure 4B:
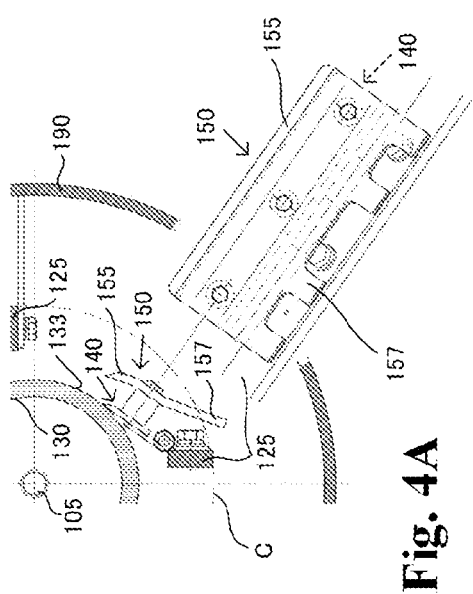

Furthermore, as shown in FIG. 4B, the shearing blade 150 may have a configuration having a rotating shaft 158 and a stopper 159. Regarding the rotating shaft 158, the body 153 may be rotatable around the rotating shaft 158 (double arrow r) when a force in the direction of the arrow F1 is applied to the front end portion 155 of the shearing blade 150. The stopper 159 is a member for stopping the rotation of the body 153 in a predetermined position by contact with the rear end portion 157 in order to prevent the body 153 from undue rotation.

Figure 4D:
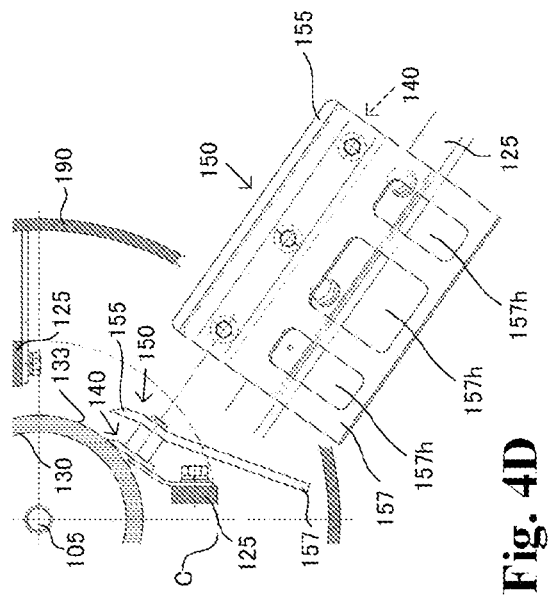
Figure 4C:
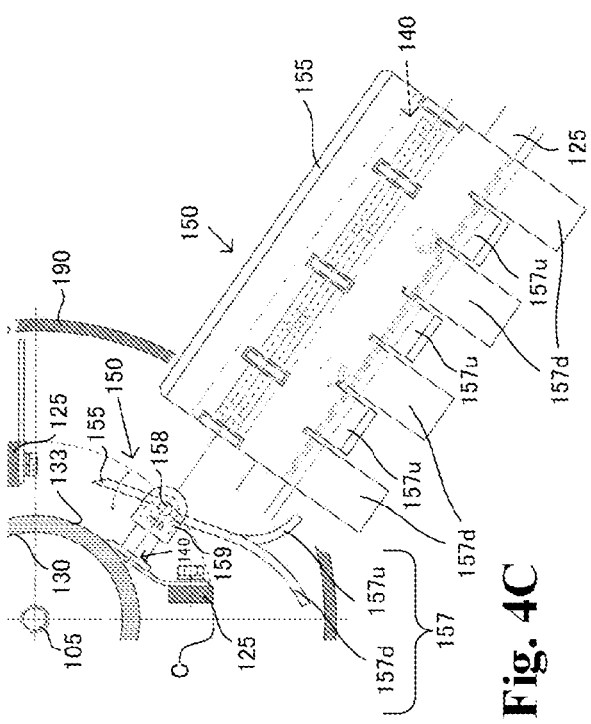

As shown in FIG. 4C, the rear end portion 157 of the shearing blade 150 may have a configuration having a plurality of downward-facing pieces 157d and a plurality of upward-facing pieces 157u. The downward-facing pieces 157d are curved in a direction toward the filtering element 130 on the rear end side, and the upward-facing pieces 157u are curved in a direction away from the filtering element 130 on the rear end side. Further, as shown in FIG. 4D, the rear end portion 157 of the shearing blade 150 may have a configuration having a plurality of openings 157h. As shown in FIG. 4D, each openings 157h may have a substantially rectangular shape, or may have other shape such as a circular shape, an elliptical shape, or the like. The size of each openings 157h may be identical or different. By forming the rear end portion 157 of the shearing blade 150 into these shapes, it can also function as a stirring member for stirring the wake flow, and prevent the unfiltered fluid supplied to the primary side chamber 120 of the filtration device 10 from staying in the vicinity of the inner wall 191 of the tube body 190 or adhering to the inner wall 191. Therefore, in the case of the filtration device 10 having the shearing blade 150 of FIG. 4D, it is not necessary to have a stirring blade 200.

As described above, according to the first embodiment, it is possible to provide a shearing member and a filtration device for reducing or preventing concentration of unfiltered fluid around a filtering surface of a filtering media of the filtration device.

Second Embodiment

In the first embodiment, a configuration in which the scrapers 140 and the shearing blades 150 are attached to the pillars 125 has been described. In the second embodiment, a filtration device 20 wherein the pillars are rotatable with respect to the central axes of the pillars, wherein the scrapers 140 and the shearing blades 150 are attached to the pillars, and wherein the angle α when the scrapers 140 abuts the filtering surface 133 of the filtering element 130 can be set to a predetermined angle will be described.

<Filtration Device>

Figure 5B:
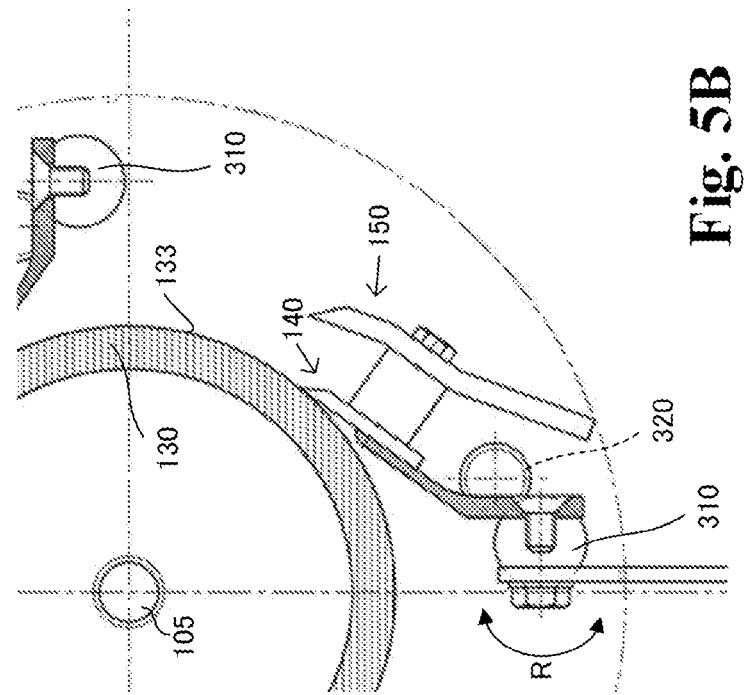
FIG. 5B shows a cross-sectional view showing the vicinity of a shearing blade of the second embodiment.
Figure 5A:
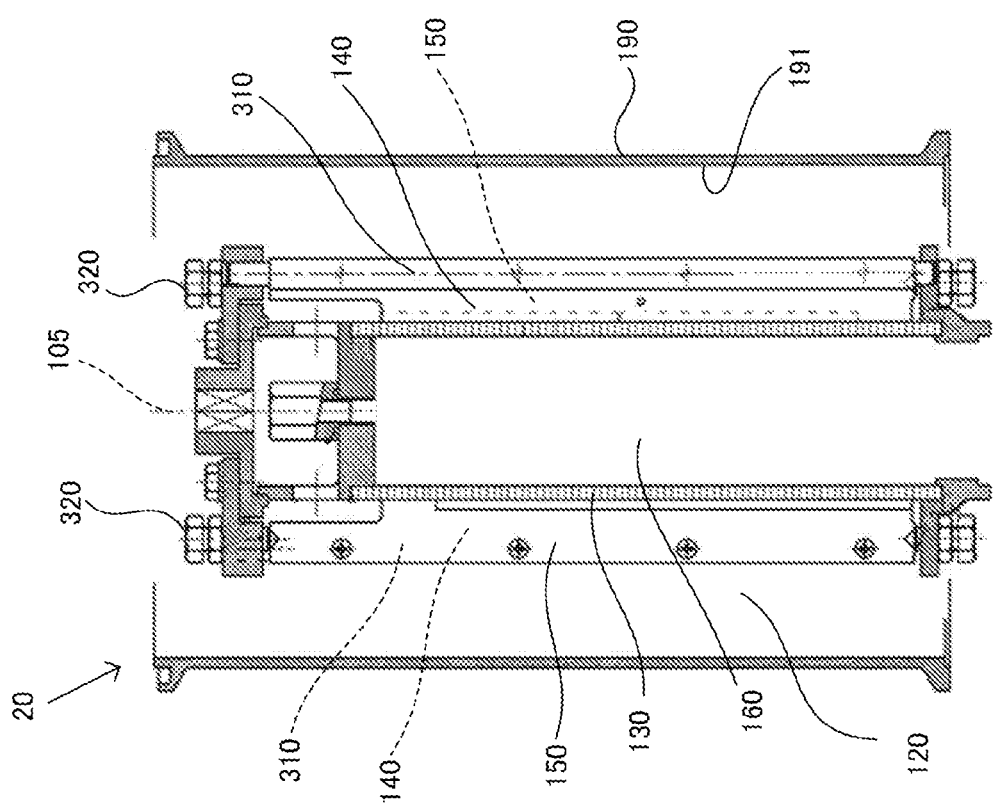
FIG. 5A shows a longitudinal sectional view showing the main part of a filtration device.

FIGS. 5A and 5B show the configuration of the filtration device 20 of the second embodiment; FIG. 5A shows a longitudinal sectional view of the tube body 190, and FIG. 5B a portion of approximately a quarter of the cross-sectional view of the tube body 190. The same configuration as the configuration described in the first embodiment are denoted by the same reference signs, and descriptions thereof are omitted.

The filtration device 20 of the second embodiment includes a rotating pin 310 and a set bolt 320 in the tube body 190. The rotating pin 310 is provided through the vertical direction in the primary side chamber 120, and in FIG. 5B, it is rotatable in the direction of double arrow R. The scrapers 140 and the shearing blades 150 are attached to the rotating pin 310. By the rotation of the rotating pin 310 in the directions of the double arrow R, the angle α at which the front end portion 145 of the scraper 140 abuts the filtering surface 133 of the filtering element 130 can be adjusted and the scraper 140 can be positioned with respect to filtering surface 133. In the filtration device 20 of FIGS. 5A and 5B, for example, four rotating pins 310 are provided. The number of rotating pins 310 is not limited to four.

The set bolts 320 are bolts for limiting the rotation of the rotating pins 310 so that the scrapers 140 adjusted and positioned to a predetermined angle α by rotating the rotating pins 310 do not rotate in the direction of double arrow R during operation. The rotation of the rotating pins 310 is limited and fixed by fastening the set bolts 320. The number of scrapers 140 attached to one rotating pin 310 may be at least one or more. The other configurations are the same as those of the first embodiment, and descriptions thereof are omitted.

As described above, according to the second embodiment, it is possible to provide a shearing member and a filtration device for reducing or preventing concentration of unfiltered fluid around a filtering surface of a filtering media of the filtration device.

Third Embodiment

In the first and the second embodiments, the shearing blades 150 are exemplified as shearing members for reducing or preventing the concentrated layers. In the third embodiment, an example in which a linear member, for example, shearing wires, are used as shearing members will be described.

<Filtration Device>

FIGS. 6A and 6B show the configuration of a filtration device 30 of the third embodiment; FIG. 6A shows a longitudinal sectional view of the tube body 190, and shows a top view of the tube body 190 on the upper left side, and a cross-sectional view of the tube body 190 on the upper right side. Also shown on the left side of tube body 190 is a shearing wire 400. FIG. 6B shows a cross-sectional view of the tube body 190. The same configuration as the configuration described in the first and the second embodiments are denoted by the same reference signs, and descriptions thereof are omitted. The filtration device 30 has a configuration in which the shearing wires 400 as shearing members are applied to the filtration device 20 having rotating pins 310 described in the second embodiment, for example. The filtration device 30 has the shearing wires 400 which are linear members which are shearing members for reducing or preventing concentrated layers.

<Shearing Wires>

Here, the shearing wires as shearing members in the third embodiment are described. The shearing wires 400 are provided vertically in the primary side chamber 120. The shearing wires 400 are formed of, for example, stainless steel or carbon. The shearing wires 400 are provided as a set of two wires between the respective rotating pins 310; the two wires being the shearing wire 400a as a first linear member, and the shearing wire 400b as a second linear member. For example, when four rotating pins 310 are provided, a total of eight shearing wires 400 are provided. The shearing wires 400 rotate in conjunction with the scrapers 140.

Regarding the shearing wires 400, the shearing wires 400a are disposed on the downstream side in the rotation direction X, and the shearing wires 400b are disposed on the upstream side in the rotation direction X. The shearing wires 400 are arranged such that the radial distance between the shearing wires 400a and the filtering surface 133 of the filtering element 130 is less than the radial distance between the shearing wires 400b and the filtering surface 133 of the filtering element 130. In other words, the radii ra from the rotating shaft 105 to the position of the shearing wires 400a and the radii rb from the rotating shaft 105 to the position of the shearing wires 400b are respectively arranged so that rb>ra is met. By arranging the set of shearing wires 400 in this manner, the concentrate layers can be sheared. It should be noted that although one set of shearing wires 400 is here described to be of two shearing wires 400a and 400b, three or more shearing wires may be applied.

As described above, according to the third embodiment, it is possible to provide a shearing member and a filtration device for reducing or preventing concentration of unfiltered fluid around a filtering surface of a filtering media of the filtration device.

Fourth Embodiment

In the fourth embodiment, methods for improving the hardness of the shearing blades 150 described in the first and second embodiments or of the shearing wires 400 described in the third embodiment will be described.

Shearing blades 150 shears concentrated layers of high slurry or high viscosity, therefore, it is preferable that the hardness at the front end portion 155 is hardened to suppress wear at the front end portion 155 (blade portion) of the body 153. Therefore, in the fourth embodiment, at least the front end portion 155 of the body 153 is subjected to a surface hardening treatment to increase hardness. As a treatment for increasing the hardness, a method of generating a DLC film on the surface of front end portion 155 by a DLC (diamond-like carbon) coating, for example, can be raised. The treatment of increasing the hardness of the surface at the front end portion 155 is not limited to DLC coating, and other known surface hardening treatment methods may be used.

The surface hardening treatment is not limited to the front end portion 155 of the body 153. For example, the entire body 153 or the entire shearing blade 150 may be subjected to surface hardening treatment. The shearing wires 400 may also be subjected to surface hardening treatment. Furthermore, the filtering surface 133 of the filtering element 130 or the inner wall 191 of the tube body 190 may also be subjected to surface hardening treatment. In addition, the surface hardening treatment may be applied to other portion where its wear in the filtration devices 10, 20 and 30 is desired to be suppressed.

As described above, according to the fourth embodiment, it is possible to provide a shearing member and a filtration device for reducing or preventing concentration of unfiltered fluid around a filtering surface of a filtering media of the filtration device.

While preferred embodiments of the present invention have been described above, the present invention is not limited thereto, and various modifications and changes can be made within the scope of the gist thereof.

The filtration devices are not limited to those shown in FIG. 1 and the like, and any filtration device having filtering media at the boundary between the primary side and the secondary side may be adopted.

In FIG. 1 and the like, the outer circumferential side of the filtering element 130 is defined as the primary side chamber 120, and the inner circumferential side thereof the secondary side chamber 160; however, a configuration in which the primary side and the secondary side are reversed may also be adopted.

The shearing members have been described as blades and linear members; however, they are not limited thereto. Any member having the function of preventing generation of the concentrated layer around the filtering surface of the filtering media may be adopted.

The pillars, the scrapers, and the shearing blades are provided at four locations around the filtering element; however, the present invention is not limited thereto, and may be provided with at least at one or more locations.

One shearing blade is provided for one scraper, but two or more shearing blades may be provided for one scraper. That is, a double, triple, or more shearing blades may be provided in the radial direction for one scraper.

When a comb blade shape is adopted in a scraper, a shearing blade, or a stirring blade, the shape may be rectangular or curved. The depth of the comb-like notch is determined, for example, according to the physical properties of the unfiltered fluid, the performance of the filtration device, and the like.

What is claimed is:

1. A filtration device comprising:
   a filtering media having a filtering surface and a plurality of filter pores provided on the filtering surface for filtering unfiltered fluid introduced into a primary side,
   a cleaning member abutting the filtering media for cleaning the filtering surface by rotating in a rotational direction,
   a pillar provided at the primary side with its longitudinal direction in the vertical direction which is substantially perpendicular to the rotational direction, to which the cleaning member is attached,
   a shearing member comprising a blade that has a downstream end in the rotational direction and an upstream end in the rotational direction, and that is mounted to the cleaning member, and
   a tube body housing the filtering media, the cleaning member, the pillar, and the shearing member,
   wherein at least the downstream end of the blade is disposed between the filtering surface and a circle defined by the outer circumferential end of the pillar in a radial direction substantially perpendicular to the rotational direction, and
   wherein a distance between the downstream end and the filtering surface in the radial direction is shorter than a distance between the upstream end and the filtering surface in the radial direction.

2. The filtration device according to claim 1, wherein the downstream end of the blade has a comb blade shape wherein convex portions and concave portions are arranged consecutively.

3. The filtration device according to claim 2, further comprising:
   a stirring member attached to the pillar for stirring the unfiltered fluid in the vicinity of an inner wall of the tube body.

4. The filtration device according to claim 2, wherein the pillar is rotatable around a central axis of the pillar.

5. The filtration device according to claim 1, wherein a plurality of blades are mounted in the radial direction to the cleaning member.

6. The filtration device according to claim 5, further comprising:
   a stirring member attached to the pillar for stirring the unfiltered fluid in the vicinity of an inner wall of the tube body.

7. The filtration device according to claim 5, wherein the pillar is rotatable around a central axis of the pillar.

8. The filtration device according to claim 1, further comprising:
   a stirring member attached to the pillar for stirring the unfiltered fluid in the vicinity of an inner wall of the tube body.

9. The filtration device according to claim 8, wherein the pillar is rotatable around a central axis of the pillar.

10. The filtration device according to claim 1, wherein the pillar is rotatable around a central axis of the pillar.

11. A filtration device comprising:
    a filtering media having a filtering surface and a plurality of filter pores provided on the filtering surface for filtering unfiltered fluid introduced into a primary side,
    a cleaning member abutting the filtering media for cleaning the filtering surface by rotating in a rotational direction,
    a pillar provided at the primary side with its longitudinal direction in the vertical direction which is substantially perpendicular to the rotational direction, to which the cleaning member is attached,
    a shearing member comprising a first linear member extending in a vertical direction and a second linear member disposed at an upstream side in a rotational direction and extending in the vertical direction, and
    a tube body housing the filtering media, the cleaning member, the pillar, and the shearing member,
    wherein at least the first linear member is disposed between the filtering surface and a circle defined by the outer circumferential end of the pillar in a radial direction substantially perpendicular to the rotational direction, and
    wherein a distance between the first linear member and the filtering surface in the radial direction is shorter than a distance between the second linear member and the filtering surface in the radial direction.

12. The filtration device according to claim 11, further comprising:
    a stirring member attached to the pillar for stirring the unfiltered fluid in the vicinity of an inner wall of the tube body.

13. The filtration device according to claim 11, wherein the pillar is rotatable around a central axis of the pillar.

* * * * *